United States Patent
Oda

(10) Patent No.: US 6,820,556 B1
(45) Date of Patent: Nov. 23, 2004

(54) INITIATOR ASSEMBLY

(75) Inventor: Shingo Oda, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 101 days.

(21) Appl. No.: 10/300,899

(22) Filed: Nov. 21, 2002

Related U.S. Application Data

(60) Provisional application No. 60/360,009, filed on Feb. 28, 2002.

(30) Foreign Application Priority Data

Nov. 21, 2001 (JP) .................................. 2001-355571

(51) Int. Cl.[7] ............................ F42B 3/10; F42B 3/107; F42B 3/12; B60R 21/26
(52) U.S. Cl. ....................... 102/202.7; 102/202.9; 102/202.14; 280/741
(58) Field of Search .................... 102/202.1, 202.2, 102/202.5, 202.6, 202.7, 202.8, 202.9, 202.14; 280/741

(56) References Cited

U.S. PATENT DOCUMENTS

| | | | |
|---|---|---|---|
| 3,135,200 A | | 6/1964 | Jackson |
| 3,659,527 A | | 5/1972 | Abegg et al. |
| 3,786,760 A | * | 1/1974 | Feldman ................. 102/526 |
| 4,271,453 A | | 6/1981 | Yajima et al. |
| 4,520,731 A | * | 6/1985 | Gotz et al. ............... 102/527 |
| 4,777,878 A | | 10/1988 | Johnson et al. |
| 5,241,910 A | | 9/1993 | Cunningham et al. |
| 6,073,963 A | * | 6/2000 | Hamilton et al. ........ 102/202.9 |
| 6,341,562 B1 | * | 1/2002 | Brisighella ............ 102/202.14 |
| 6,508,175 B1 | * | 1/2003 | Avetisian .............. 102/202.14 |

FOREIGN PATENT DOCUMENTS

| | | | | |
|---|---|---|---|---|
| DE | 3308635 | * | 9/1984 | ............. 102/202.5 |
| JP | 57-48516 B2 | | 10/1982 | |
| JP | 2896262 B2 | | 3/1999 | |
| JP | 11-321541 A | | 11/1999 | |

* cited by examiner

*Primary Examiner*—Michael J. Carone
*Assistant Examiner*—James S. Bergin
(74) *Attorney, Agent, or Firm*—Birch, Stewart, Kolasch & Birch, LLP

(57) ABSTRACT

An initiator assembly is provided with a metallic collar securely combined to an electric type initiator to block a moisture penetration into the inside of a gas generator, thereby obtaining operation reliability of the gas generator. In the initiator assembly, at least part of the electric type initiator is surrounded by the metallic collar, and integrated with a resin. At least either of an annular protrusion and a cylindrical protrusion provided in the direction to surround the electric type initiator is formed on the metallic collar, and the protrusion is covered with the resin.

14 Claims, 3 Drawing Sheets

INITIATOR ASSEMBLY

This application claims priority on provisional Application No. 60/360,099 filed on Feb. 28, 2002, the entire contents of which are hereby incorporated by reference.

BACKGROUND OF THE INVENTION

1. Field of the Invention

The present invention relates to an initiator assembly used in various kinds of gas generators such as a gas generator for an air bag, a gas generator for a seatbelt pretensioner, and a gas generator for a curtain air bag, which are safety systems of motor vehicles, and more particularly, to an initiator assembly in which an electric type initiator adapted to be actuated by an electrical signal and a metallic collar surrounding at least part of the electric type initiator are integrated with resin, a gas generator using this assembly, and a combined structure of a metallic collar and a resin in the initiator assembly.

2. Description of Related Art

An initiator assembly includes an electric type initiator adapted to be actuated by an electrical signal from a collision detecting system, and it is mounted, interposing a metallic collar or the like, to various safety devices for a motor vehicle, such as a gas generator for an air bag, a gas generator for a seatbelt pretensioner, a gas generator for a curtain air bag, and the like. Since the initiator assembly has to actuate these safety devices, reliable actuation of the initiator assembly is essential in order to actuate a gas generator unfailingly.

Also, generally in the initiator assembly, a priming included in an electric type initiator is ignited and burnt, so that it is necessary for the priming to avoid moisture absorption in order to securely actuate the initiator assembly. Furthermore, since the initiator assembly is mounted to a gas generator, it is necessary to securely seal a mounting portion of the initiator assembly to the gas generator or to seal between respective constituent elements in the initiator assembly itself in order to prevent moisture absorption of explosives as a gas generating agent charged in the gas generator. Further, the above-described operation of the initiator assembly must be not only secured, but also facilitate a manufacture of an initiator assembly itself or an assembling of the initiator assembly to a gas generator.

A conventional initiator assembly is disclosed in, for example, JP-A 11-321541. An initiating device assembly (an initiator assembly) disclosed in this publication is obtained by integrating an initiating device and a collar assembly with an injection-molded insulating material, which reduces a size of the injection-molded portion and that combines the initiating device assembly and an inflator apparatus properly and easily.

However, in the initiator assembly disclosed in this publication, nothing is considered concerning improvement of the operation reliability in the initiator assembly itself and a secure actuation in the gas generator.

Accordingly, in the conventional initiator assemblies, there is still a room to be improved in view of realizing a sufficient operation reliability and facilitating a manufacturing.

SUMMARY OF THE INVENTION

Under these circumstances, the present invention provides an initiator assembly in which a combined structure of a metallic collar and an electric type initiator is reliable to block entering of a moisture into the gas generator, and an operation reliability is secured, not increasing manufacturing steps or manufacturing cost.

The above-described problem is solved by an initiator assembly of the present invention provided with features described below.

That is, the present invention provides the initiator assembly in which an electric type initiator and a metallic collar surrounding at least part of the electric type initiator are integrated with a resin, wherein at least one of an annular protrusion and a cylindrical protrusion provided in a direction of surrounding the electric type initiator is formed on the metallic collar, and the protrusion is covered with the resin.

The electric type initiator is actuated on the basis of an actuation signal to generate a flame for actuating a gas generator, and it includes at least a single electroconductive pin, means for converting electrical energy received by the electroconductive pin to thermal energy (for example, a bridge wire), and a priming which is ignited by the converted thermal energy to be burnt. Also, the metallic collar is for fixing the electric type initiator to the gas generator and it has at least one or more protrusions.

The protrusion is formed in an annular shape and/or a cylindrical shape to surround the electric type initiator, and it is formed on the metallic collar. As this protrusion, one or plural annular projections can be provided, or one or plural cylindrical projections can be provided or both an annular protrusion and a cylindrical protrusion can be provided. For example, when the metallic collar has an inner hole which the electroconductive pin of the electric type initiator passes through, the protrusion can be provided at a portion where the inner hole is formed. Also, the protrusion can be formed at an end surface of the metallic collar in a cylindrical shape to surround a periphery of the electric type initiator. In particular, the protrusion which is formed cylindrically is desirable, because a surface area of the protrusion can be obtained largely and a contacting area with resin can be made large enough.

The protrusion is covered with a resin integrating the electric type initiator and the metallic collar, and preferably, the protrusion is held in the thickness direction by the resin. By holding the protrusion with resin, the metallic collar and the resin can be combined more securely, so that a gap to allow moisture to pass through cannot be made between the both. In order to interpose the protrusion the resin, preferably, molding-shrinkage or post-shrinkage of the resin is utilized. Accordingly, it is preferable that the resin integrating the electric type initiator and the metallic collar is injection-molded between the both members. It is also preferable that the resin is injected to cover the protrusion in the injection-molding. The resin desirably molding-shrinks or post-shrinks by the injection-molding so that the resin can hold the protrusion.

As described above, in the initiator assembly of the present invention, the protrusion is provided at the metallic collar, so that the metallic collar and the resin can be combined securely by utilizing the molding-shrinkage or the post-shrinkage of resin without causing any difficulty in manufacturing.

Incidentally, taking account of interposing the protrusion by a molding-shrinkage or a post-shrinkage of a resin, preferably, the protrusion is made thicker, but not to such an extent that a structure of the initiator assembly is disturbed. For this reason, it is preferable that the thickness of the protrusion is decided in view of a molding-shrinkage rate of resin to be used.

In the present invention, a preferable resin which integrates the electric type initiator and the metallic collar has the molding-shrinkage rate of 1% or less, more preferably between 0.1 and 0.8%. Even a resin which becomes solidified after being injection-molded can be used in the initiator assembly of the present invention because any resin molding-shrinks to some extent. However, a resin with such a large molding-shrinkage that a molding-shrinkage rate exceeds 1% is undesirable because it is deformed, warped or obtains a shrink mark after solidification, and consequently, a gap may be formed between the electrical type initiator and the resin or between the metallic collar and the resin. When the molding-shrinkage rate is not less than 0.1%, the protrusion can be held securely by the molding-shrinkage of resin, which is preferable.

Incidentally, a resin containing inorganic charging material such as glass fiber, inorganic filler or the like is known that molding-shrinkage rates in a flowing direction (MD) of injection-molded resin and in a direction (TD) perpendicular thereto are different from each other due to the orientation of the organic filling material. Therefore, in case that such a resin is used, a resin having such molding-shrinkage rates (in the flowing direction and the perpendicular direction) that no undesirable gap occurs at least between the electric type initiator and the resin, between the metallic collar and the resin, or the like is used.

Also, the resin containing inorganic charging material has the molding-shrinkage rate in the perpendicular direction larger than in the flowing direction, and preferably, the protrusion is formed to be thicker in the perpendicular direction of the resin than in the flowing direction of the resin. With this, the protrusion is held more securely by the molded-shrunk resin while suppressing the shrinkage coefficient in the flowing direction of resin.

Accordingly, when the protrusion is formed in a cylindrical shape to surround the initiator assembly and the protrusion is held by the molded-shrunk resin in the thickness direction thereof, it is preferable that the resin is injected to flow in the axial direction of the cylindrical protrusion.

Also, as a resin used in this invention, a thermosetting resin can be used, but a thermoplastic resin is preferably used in view of injection-molding, and a resin containing glass fiber or other inorganic charging material is more preferably used. In the resin, a coefficient of water absorption after being submerged for 24 hours at 23° C. (the same will apply thereinafter) is preferably 0.005 to 0.5% is used, more preferably 0.005 to 0.3%, and a tensile strength is preferably 70 to 250 MPa, more preferably 100 to 250 MPa. Further, it is desirable to use a resin in which a coefficient of linear expansion is not more than $8 \times 10^{-5}/°$ C., the tensile strength is not less than 100 MPa and a dielectric breakdown voltage is not less than 10 MV/m. In particular, the tensile strength is preferably not less than 170 MPa but not more than 250 MPa. Accordingly, the tensile strength is preferably not less than 100 MPa but not more than 250 MPa, most preferably, not less than 170 MPa but not more than 250 MPa.

Examples of such a resin include nylon 612, polyacrylate, polybutylene telephtalate, polyphenylene sulfade or liquid crystal polymer. These resins may contain inorganic charging material such as glass fiber, glass filler, or mineral. In particular, it is preferable that glass fiber of 20 to 80 weight % is contained in polybutylene telephtalate, glass fiber of 20 to 80 weight % is contained in polyphenylene sulfade and mineral of 20 to 80 weight % is contained in liquid crystal polymer. Particularly, in case of using glass reinforced resin containing glass fiber, the orientation of the glass fiber is desirably adjusted to be along the extending direction of an electroconductive pin inserted into the resin. This is because the molding-shrinkage rate of the resin in the thickness direction of the electroconductive pin becomes larger enough to securely block permeation of moisture between the pin and the resin. Also, a percent content of inorganic charging material in each resin material is more preferably 20 to 50 weight %.

By holding the protrusion with the above-described molding-shrinking resin after being injection-molded, moisture does not penetrate the resin to reach the priming, so that deterioration due to moisture absorption in a priming can be avoided as much as possible. That is, when the electric type initiator and the metallic collar are integrated with each other using such a resin, such an initiator assembly can be obtained that can exhibit an original operation after being left in a motor vehicle or the like for a long term. In particular, polyphenylene sulfade or liquid crystal containing filling material preferably is used, because high productivity and low cost can be achieved by injection-molding.

Also, in the initiator assembly of the present invention, it is preferable that a rotation-preventing means which prevents rotation of the resin and the metallic collar is provided in order to further securely combine the resin and the metallic collar. An example of such a rotation-preventing means can be formed by providing an concavo-convex portion on the metallic collar in a contacting surface between the metal collar and the resin to make the resin engaged with the concavo-convex portion. The concavo-convex portion can also be formed on the above protrusion, and when the concavo-convex portion is formed on the protrusion in the surface held by the resin, the concavo-convex portion and the resin can be securely engaged with each other to prevent rotation between the resin and the metallic collar.

However, when the concavo-convex portion is formed on the metallic collar as the rotation-preventing means, it is preferable that the resin engaged with the concavo-convex portion is formed not to be damaged by a pressure due to actuation of the electric type initiator. For example, in order to eliminate a possibility such that the concavo-convex portion causes a resin cracking, no concavo-convex portion is preferably formed on the metallic collar in a portion or a surface which supports the electric type initiator against a pressure generated at a time of actuation of the electric type initiator. Accordingly, in case of forming the rotation-preventing means comprising an concavo-convex portion on the protrusion, the rotation-preventing means is preferably formed on a cylindrical protrusion extending in the axial direction of the initiator assembly.

Also, if the inner hole of the metallic collar in which the electroconductive pin of the electric type initiator passes through is formed to have a smaller inner diameter portion than at least an outer diameter of the electric type initiator, the electric type initiator never passes through the inner hole to fall off due to that the resin melts by heat at a time of actuation of the electric type initiator. For example, a projection extending radially and inwardly is formed on a wall surface in which the inner hole is formed and also, the inner hole may be formed in an oval shape, a rectangular shape, various polygonal shapes or shapes similar thereto. In the metallic collar thus formed, the electric type initiator is supported by the inner hole in part having a smaller inner diameter, and thereby, the electric type initiator does never pass through the inner hole. Furthermore, the inner hole is formed in any shape except for a circular shape, for example, an oval shape (see FIG. 5), a polygonal shape (see FIG. 6), or the like, which is advantageous to prevent rotation between the resin and the collar. Accordingly, it is desirable to form the inner hole in a shape that can block rotation between the resin and the collar.

Further, in the above-described initiator assembly, the metallic collar in a portion for receiving a connector is not covered with the resin, exposing this portion of the metallic collar. Thereby, there can be eliminated a possibility such that the connector received at this portion may be dislocated due to reaction at a time of actuation of the initiator assembly.

Also, in the initiator assembly, since the resin can be fixed to the metallic collar at the above-described protrusion, an excess resin required for fixing the both can be decreased to reduce manufacturing cost.

In the above-described initiator assembly, not only that a single electric type initiator is provided in a single metallic collar, but also that two electric type initiators may be provided in a single metallic collar. Even when two electric type initiators are provided in a single metallic collar, the collar and the initiators can be integrated with resin, and the resin and the metallic collar can be combined securely by providing the above-described protrusion in the collar.

The above-described initiator assembly can be accommodated in a housing having a gas discharging port together with, for example, a gas generating agent to be burnt and/or inflated at actuation for generating an operating gas, thereby forming a gas generator for an air bag of the present invention.

In the gas generator of the present invention using the above-described initiator assembly, the metallic collar and the resin is combined securely and moisture cannot penetrate from this portion. For this reason, moisture absorption of the gas generating agent or the like can be avoided, and operation reliability of the gas generator can be guaranteed even after a long-term service, and also, an original operation performance can be obtained.

Such a gas generator may include a single or at least two combustion chambers accommodating a gas generating agent in a housing or may be filled with a pressurized medium in addition to the gas generating agent to be burnt to generate an operating gas. Also, the gas generator is not used only for a gas generator used for an air bag, but also for the one used for a seatbelt pretensioner or the one used for a curtain air bag.

According to the present invention, moisture can effectively be prevented from penetrating the inside of an igniter without causing increase in manufacturing cost of an initiator assembly. Further, in a gas generator using this initiator assembly, since moisture cannot penetrate the inside of the initiator assembly, moisture-absorption and deterioration of a gas generating agent (a priming) can effectively be prevented, so that a gas generator which can maintain an original performance even after a long-term service can be obtained.

DETAILED DESCRIPTION OF THE INVENTION

Figure 1:
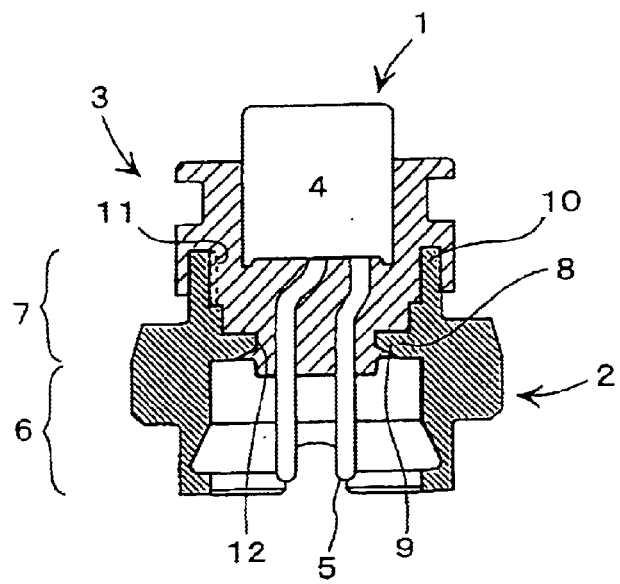
FIG. 1 is a vertical cross sectional view showing an initiator assembly according to the present invention.

A gas generator for an air bag of the present invention will be explained as follows with reference to embodiments shown in the drawing.

FIG. 1 is a vertical cross sectional view showing one embodiment of an initiator assembly. In particular, in the initiator assembly shown in this drawing, a single metallic collar 2 and a single electric type initiator 1 are integrated with each other by a resin 3.

The electric type initiator 1 comprises a pair of electroconductive pins 5 and an igniting portion 4, and the electroconductive pins 5 are bridged to each other inside the igniting portion 4 by a bridge wire (not shown) while they are electrically insulated from each other. A priming provided inside the igniting portion is in contact with the bridge wire bridging between both the electroconductive pins 5, and the priming is ignited and burnt by heat generation of the bridge wire to generate flame required for actuating the gas generator.

Then, the electric type initiator 1 is integrated with the metallic collar 1 by a resin 3.

The metallic collar 2 is formed in a cylinder-like shape, and the interior thereof comprises a connector receiving portion 6 for receiving a connector (not shown) and a resin-infilled portion 7 contacting with the resin. An inner hole-forming portion 8, extending 8 annularly towards the center of the metallic collar 2, is provided in the resin-infilled portion 7 of the connector receiving portion 6 to form an inner hole 12 with the end thereof.

Then, a surface of the inner hole forming portion 8 near the connector receiving portion 6 inclines upward (in other words, towards the resin-infilled portion 7) so that the inner hole forming portion 8 is narrowed, and a portion which inclines and protrudes is defined as a first protrusion 9. That is, in this embodiment, part of the inner hole forming portion 8 which forms the inner hole 12 is defined as the first protrusion 9.

Since the resin is filled also in the inclined portion, the first protrusion 9 formed annularly is covered with the resin. Therefore, as the resin molding-shrinks or post-shrinks, the first protrusion 9 is held in the thickness direction between the resin filled in the inclined portion and the resin existing on the resin-infilled portion 7 of the inner hole forming portion 8, so that the resin 3 and the metallic collar 2 are joined securely.

Also, in the metallic collar 2 shown in the present embodiment, a second protrusion 10 is provided on the end of the resin infilled resin-infilled portion 7. The second protrusion 10 is formed substantially into a cylindrical shape extending in the axial direction of the metallic collar 2, and it surrounds the electric type initiator. Since the second protrusion 10 is also covered with a resin integrating the electric type initiator 1 and the metallic collar 2, the second protrusion 10 is held in the thickness direction due to a molding-shrinkage or a post-shrinkage of the resin 3, so that the resin 3 and the metallic collar 2 is joined securely.

In the initiator assembly shown in FIG. 1, the first protrusion 9 formed annularly and the second protrusion 10 formed in a cylindrical shape are provided on the metallic collar 2. Also, only one of these protrusions can be provided. In this case, more preferable effect can be obtained by forming a protrusion extending axially like the second protrusion 10 and then interposing the protrusion in a resin. This is because a contacting area between the resin and the protrusion can be sufficiently secured by forming the protrusion longer in axial direction like the second protrusion. Also, in order to further reduce an amount of the resin to be used, it is preferable that the first protrusion 9 in FIG. 1 is provided.

The first protrusion 9 and the second protrusion 10 are held in the thickness direction due to molding-shrinkage or post-shrinkage of the resin, so that the resin and the metallic collar 2 can be joined securely. Namely, this means that a gap through which moisture passes cannot be made between the resin 3 and the metallic collar 2, and it promises a reliable operation of the gas generator or the like. For this reason, it is preferable that the resin 3 for integrating the electric type initiator 1 and the metallic collar 2 is less water-absorbent and has a small linear expansion rate.

In the initiator assembly of the present embodiment, particularly, a resin prepared by filling a glass filler of 33% into a nylon 612 (molding-shrinkage rate in a flow direction: 0.2%, a molding-shrinkage rate in a perpendicular direction thereto: 0.3%, and a linear expansion rate: $2.3 \times 10^{-5}$ cm/cm° C.) can be used. This resin 3 is preferable because deformation or curving after molding can be suppressed while having a molding-shrinkage rate suitable for holding the protrusions 9 and 10.

Further, in the initiator assembly of the present invention, particularly, in order to hold the protrusion by the resin 3 more securely, it is desirable to provide rotation-preventing means between the resin 3 and the metallic collar 2. For this reason, also in this embodiment, means for blocking rotation between these members (a concavo-convex portion 11) is provided.

Figure 2:
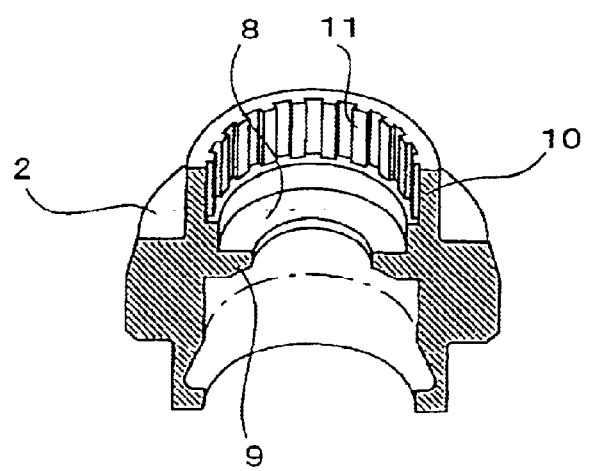
FIG. 2 is a vertical cross sectional perspective view of a main portion showing a metallic collar in one embodiment.

In order to prevent the rotation between the resin 3 and the metallic collar 2, in this embodiment, a concavo-convex portion 11 like an internal gear is formed on an inner circumferential surface of the second protrusion to make the resin 3 mesh the concavo-convex portion 11 as shown in FIG. 2. The concavo-convex portion 11 can be formed not only on the inner peripheral surface of the second protrusion 10 but also it can be formed on any part of the metallic collar 2 as long as it contacts the resin. Therefore, for example, the concavo-convex portion can be formed on the first protrusion 9. Incidentally, when the concavo-convex portion 11 is formed on the second protrusion 10 like this embodiment, the pressure at a time of actuation of the electric type initiator does not act on the concavo-convex portion, so that cracking or the like of the resin started from the concavo-convex portion 11 can be prevented.

The initiator assembly formed in the above manner can be provided together with a gas generating agent which is ignited and burnt for generating a combustion gas, or the like in a housing having a gas discharging port, and thereby, for example, a gas generator for an air bag shown in the following Embodiment 2 can be obtained.

Embodiment 2

Figure 3:
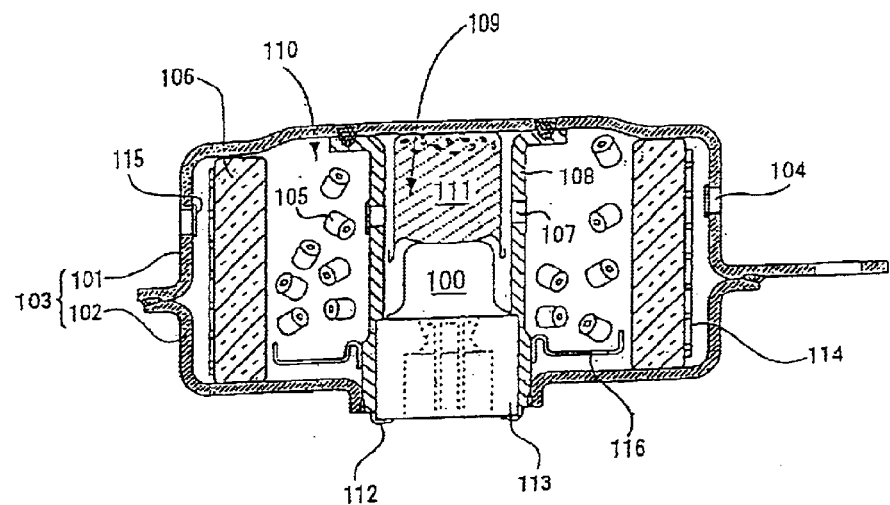
FIG. 3 is a vertical cross sectional view showing a gas generator for an air bag of the present invention.
Figure 4:
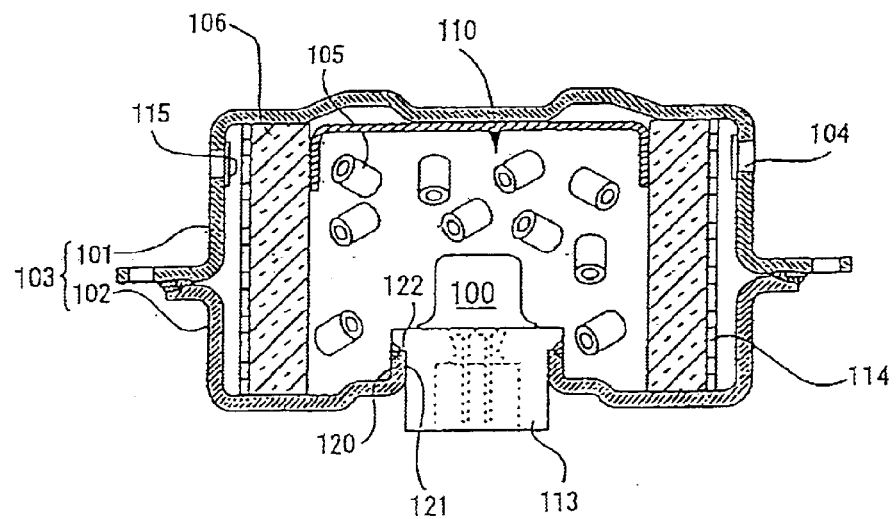
Figure 5:
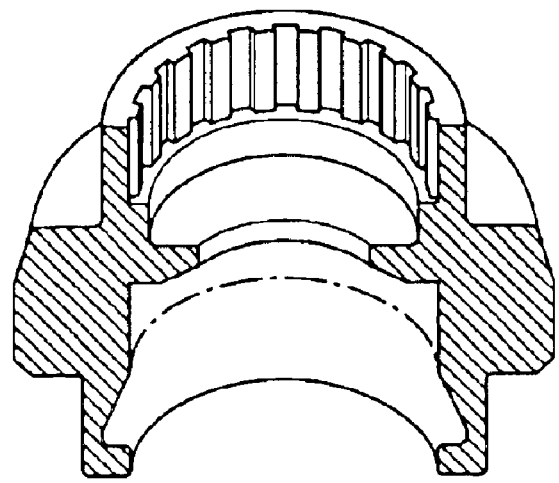
FIG. 5 is a vertical cross sectional perspective view of a main portion showing a metallic cover having, as an example of a shape other than a regular circle, an inner hole having an elliptical shape.
Figure 6:
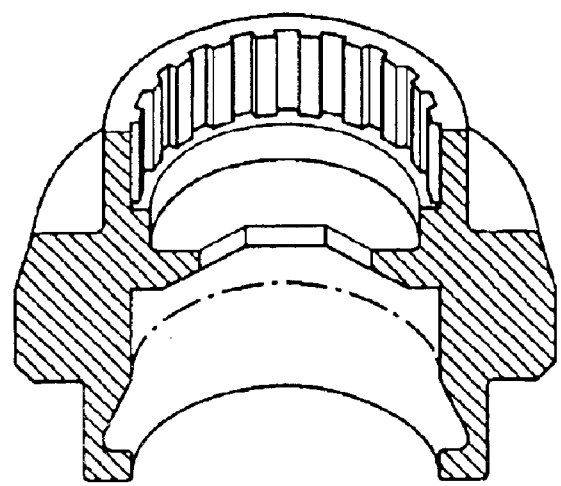
FIG. 6 is a vertical cross sectional perspective view of a main portion showing a metallic cover having, as an example of a shape other than a regular circle, an inner hole having a hexagonal shape.

FIGS. 3 and 4 show embodiments of gas generators for air bags using an initiator assembly 100 having the same feature as the above-described initiator assembly.

The gas generator comprises, in a housing 103 formed by joining a diffuser shell 101 having a gas discharging port, and a closure shell 102 closing the diffuser shell, ignition means including the above initiator assembly 100, a gas generating agent 105 adapted to be ignited and burnt due to activation of the ignition means for generating an operating gas to inflate an air bag (bag body), and filter means 106 for purifying and/or cooling the operating gas generated by combustion of the gas generating agent 105.

In the gas generator shown in FIG. 3, an inner cylindrical member 108 provided at its peripheral surface with a plurality of flame-transferring holes 107 is disposed at the center of the housing, a space 109 for accommodating the ignition means is formed inside the inner cylindrical member 108, and a combustion chamber 110 for accommodating the gas generating agent 105 is formed radially outside.

The ignition means of the gas generator shown in FIG. 3 comprises the initiator assembly 100 shown in the above embodiment and a transfer charge 111 which is ignited and burnt due to activation of the initiator assembly and then ejects a flame from the flame-transferring hole 107 to ignite the gas generating agent. The initiator assembly 100 is fixed in the lower portion of the inner cylindrical member 108. The inner cylindrical member 108 and the initiator assembly 100 are joined by crimping an opening end 112 of the inner cylindrical member 108 to fix the metallic collar 113 of the initiator assembly 100 or the like. Then, the inner cylindrical member 108 is combined by welding the opening end 112 which receives the initiator assembly 100 to the closure shell 102.

The gas generating agent 105 is stored in the combustion chamber 110, and the filter means 106 for purifying and/or cooling a operating gas generated by combustion of the gas generating agent 105 is disposed outside thereof. The filter means 106 is formed cylindrically, using laminated wire mesh or the like, and its outer peripheral surface is disposed to face an inner peripheral surface of the housing 103. Preferably, a gap serving as a gas flow path is formed between an outer peripheral surface of the filter means 106 and an inner peripheral surface of the housing 103, so that the whole filter means 106 can be utilized. The outer peripheral surface of the filter means 106 is supported by a porous cylindrical punched plate 114 to suppress expansion of the filter means outwardly in the radial direction.

In the above-described gas generator, when the initiator assembly 100 is actuated, the transfer charge 111 arranged in the vicinity thereof is ignited and burnt to eject its flame from the frame-transferring holes 107, which is formed in the inner cylindrical member 108, into the combustion chamber 110. The flame ignites and burns the gas generating agent 105 in the combustion chamber 110 to generate an operating gas. The operating gas is purified and/or cooled during passing through the filter means 106, and then, the gas ruptures a sealing tape 115 closing the gas discharging port 104 to be discharged from the gas discharging port 104. Incidentally, in FIG. 3, numeral 116 denotes an under plate formed in a substantial ring shape, and this under plate supports the gas generating agent 105 in the combustion chamber 110.

Also, the initiator assembly can be used in a gas generator shown in FIG. 4. The gas generator shown in this drawing is different from the gas generator shown in FIG. 3 in that an inner cylindrical member (numeral 108 in FIG. 3) is not disposed in the housing. Therefore, this embodiment is characterized in constitution of an ignition means and its arrangement method, in particular.

That is, in the gas generator shown in this drawing, the initiator assembly 100 is directly mounted to the closure shell 102 and the gas generating agent 105 is arranged to surround the initiator assembly. Accordingly, in the gas generator shown in this drawing, a transfer charge (numeral 111 in FIG. 3) is not used, and when the initiator assembly 100 is actuated, its flame directly ignites and burns the gas generating agent 105 to generate an operating gas for inflating an air bag.

Particularly, in the aspect shown in this drawing, a closure shell forming a housing has, nearly at the center thereof, a central opening 121 provided with a peripheral wall portion 120 bent inward, the initiator assembly 100 is accommodated in the central opening 121, and an end surface of the peripheral wall portion 120 and a metallic collar 113 of the initiator assembly 100 are attached to each other. These members are attached each other by welding or the like, so that the metallic collar of the initiator assembly can be fixed by such appropriate means. As shown in this drawing, a stepped notch portion 122 is formed in the metallic collar of the initiator assembly 100, to abut on an end surface of an peripheral wall portion of the central opening 121, thereby fixing the initiator assembly securely and eliminating a risk such that the initiator assembly comes off at a time of actuation. In FIG. 4, the same members as the members shown in FIG. 3 are attached with same numerals, and explanation thereof is omitted.

What is claimed is:

1. An initiator assembly, comprising:

an electric type initiator;

a metallic collar surrounding at least part of the electric type initiator, said metallic collar including a cylindrical protrusion extending towards said electric type initiator in an axial direction of the metallic collar and a concavo-convex portion formed on an inner surface of the cylindrical protrusion; and a resin injected between said electric type initiator and said metallic collar such that said metallic collar is integrally molded with the resin and the resin makes contact with the concavo-convex portion.

2. An initiator assembly according to claim 1, wherein the cylindrical protrusion surrounds at least a portion of a periphery of the electric type initiator.

3. An initiator assembly according to claim 1 or 2, further comprising:

an annular protrusion extending inwardly from an inner surface of the metallic collar and having an inner hole in which an electroconductive pin of the electric type initiator passes through.

4. An initiator assembly according to claim 1 or 2, wherein the resin holds the cylindrical protrusion in a radial direction of the cylindrical protrusion.

5. An initiator assembly according to claim 3, wherein the inner hole has a shape other than a regular circle.

6. An initiator assembly according to claim 3, wherein the inner hole has a diameter smaller than an outer diameter of the electric type initiator.

7. A gas generator, comprising:

a housing forming an outer shell;

an initiator assembly according to claim 1 or 2 arranged inside the housing; and a gas generating agent adapted to be ignited and burnt by actuation of the initiator assembly.

8. An initiator assembly according to claim 1, wherein said resin has a molding-shrinkage rate of less than 1%.

9. An initiator assembly according to claim 8, wherein said resin has a molding-shrinkage rate of between 0.1 and 0.8%.

10. An initiator assembly according to claim 1, wherein said resin contains at least one of one of glass fiber, glass filler, and mineral.

11. An initiator assembly according to claim 1, wherein said resin has a tensile strength of 70 to 250 MPa.

12. An initiator assembly according to claim 11, wherein said resin has a tensile strength of 100 to 250 MPa.

13. An initiator assembly according to claim 1, wherein said resin has a dielectric breakdown voltage of greater than 10 MV/m.

14. A metallic collar for an initiator assembly, the initiator assembly having an electric type initiator and a resin injected between the metallic collar and the electric type initiator, the metallic collar comprising:

a cylindrical protrusion extending towards the electric type initiator in an axial direction of the metallic collar such that the cylindrical protrusion surrounds at least a part of the electric type initiator; and a concavo-convex portion formed on an inner surface of the annular protrusion.

* * * * *